United States Patent [19]

Yoshida et al.

[11] Patent Number: 4,958,546
[45] Date of Patent: Sep. 25, 1990

[54] SAW BLADE

[75] Inventors: Sumio Yoshida, Ono; Yoshikazu Takegawa, Miki; Susumu Tsujimoto, Ono; Katsuhiko Kawabata, Takasago, all of Japan

[73] Assignee: Amada Company, Limited, Japan

[21] Appl. No.: 317,860

[22] Filed: Mar. 2, 1989

Related U.S. Application Data

[62] Division of Ser. No. 87,392, Aug. 18, 1987, which is a division of Ser. No. 847,731, Apr. 3, 1986.

[30] Foreign Application Priority Data

| Apr. 3, 1985 | [JP] | Japan | 60-069239 |
| Dec. 12, 1985 | [JP] | Japan | 60-277842 |
| Dec. 26, 1985 | [JP] | Japan | 60-291894 |

[51] Int. Cl.⁵ ................................. B27B 33/02
[52] U.S. Cl. .............................. 83/848; 83/835
[58] Field of Search ............... 83/835, 846–851

[56] References Cited

U.S. PATENT DOCUMENTS

| 30,265 | 10/1860 | Talbot | 83/851 |
| 81,413 | 8/1868 | Sattler | 83/850 |
| 105,261 | 7/1870 | Shailer | 83/851 |
| 204,369 | 5/1878 | Poindexter | 83/849 |
| 853,255 | 7/1904 | Miller . | |
| 1,381,930 | 6/1921 | Morgan | 83/851 |
| 1,663,241 | 12/1926 | Cheshire | 83/851 |
| 2,071,618 | 2/1937 | Ferrari et al. . | |
| 2,568,870 | 9/1951 | Ronan . | |
| 2,635,327 | 10/1950 | Enlow . | |
| 2,770,267 | 11/1956 | Edmiston | 83/848 |
| 3,810,410 | 5/1974 | Athanasoulas . | |
| 4,423,553 | 1/1984 | Miyawaki . | |
| 4,557,172 | 12/1985 | Yoneda | 83/848 |
| 4,727,788 | 3/1988 | Yoshida et al. | 83/848 |

FOREIGN PATENT DOCUMENTS

| 883602 | 10/1971 | Canada . |
| 651200 | 9/1937 | Fed. Rep. of Germany . |
| 675997 | 5/1939 | Fed. Rep. of Germany . |
| 742461 | 1/1943 | Fed. Rep. of Germany . |
| 2225227 | 12/1973 | Fed. Rep. of Germany . |
| 2758381 | 7/1979 | Fed. Rep. of Germany . |
| 446081 | 11/1912 | France . |
| 866663 | 5/1941 | France . |
| 435678 | 10/1967 | Switzerland . |
| 374103 | 6/1932 | United Kingdom . |
| 426498 | 4/1935 | United Kingdom . |
| 564152 | 9/1944 | United Kingdom . |
| 774065 | 8/1957 | United Kingdom . |
| 863529 | 3/1961 | United Kingdom . |
| 2097718 | 11/1982 | United Kingdom . |
| 2100187 | 12/1982 | United Kingdom . |
| 2113144 | 8/1983 | United Kingdom . |

Primary Examiner—Frank T. Yost
Assistant Examiner—Scott A. Smith
Attorney, Agent, or Firm—Wigman & Cohen

[57] ABSTRACT

A saw blade such as a bandsaw blade, circular saw blade, or backsaw blade has a pair of leading teeth which cut the workpiece and advance in a feed direction while the workpiece is being cut and a plurality of trailing teeth which cut the workpiece later than the leading teeth and serve to widen the leading cut channel. The leading teeth and the trailing teeth form one basic group in which the heights of the trailing teeth from a basic position on the saw blade are equal to or smaller than the height of the leading teeth. The trailing teeth are set in the right and left directions with respect to the saw blade and the leading teeth are slightly set with respect to the saw blade.

14 Claims, 12 Drawing Sheets

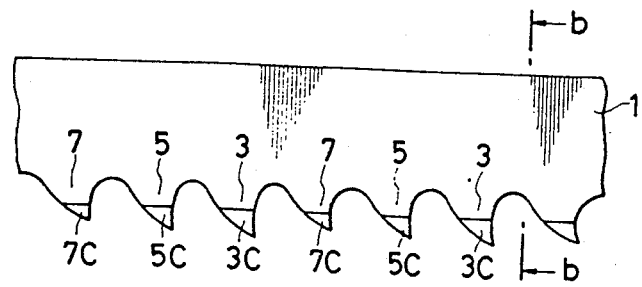
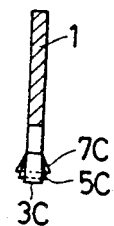
FIG.3(a)  FIG.3(b)
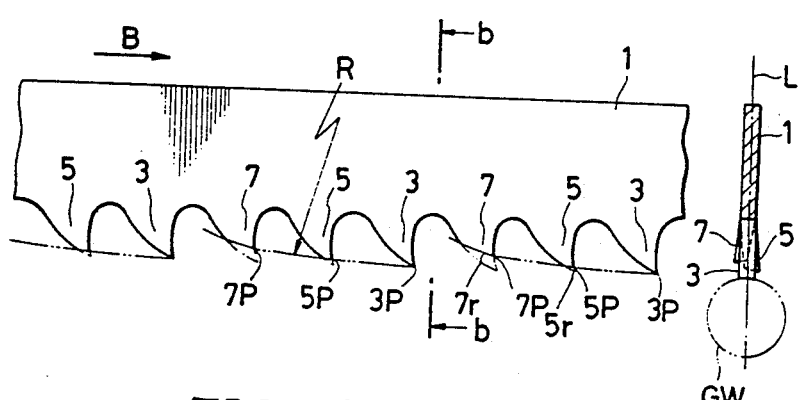
FIG.4(a)  FIG.4(b)
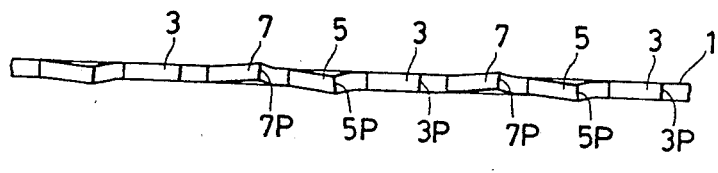
FIG.4(c)

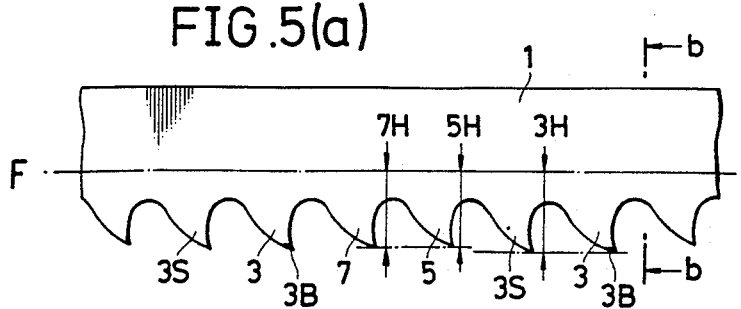
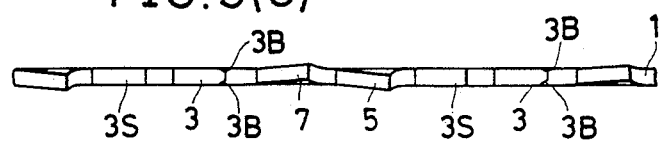
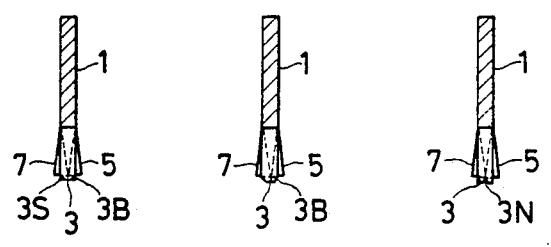
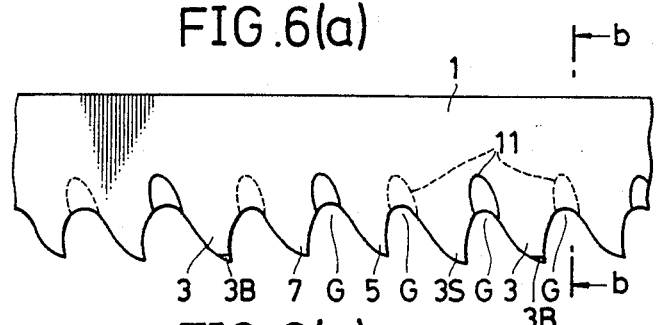
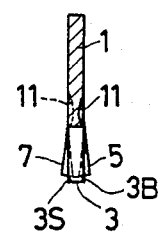
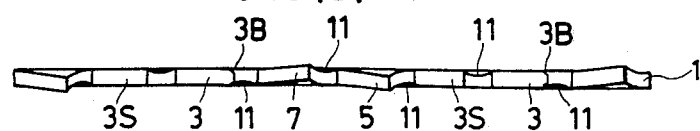

FIG. 7(a)
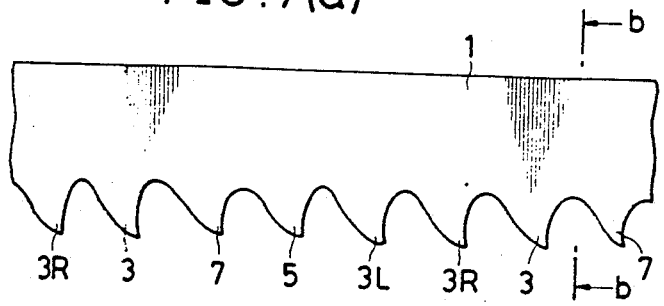
FIG. 7(b)
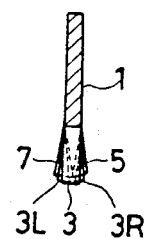
FIG. 7(c)
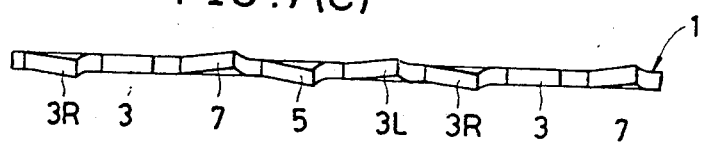
FIG. 7(d)
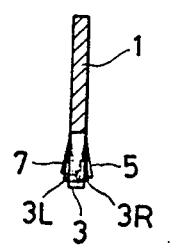
FIG. 7(f)
FIG. 7(e)
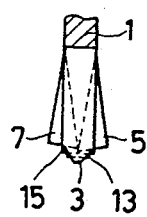
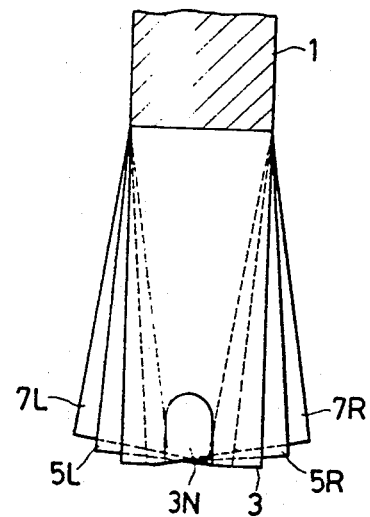

FIG.16(a)
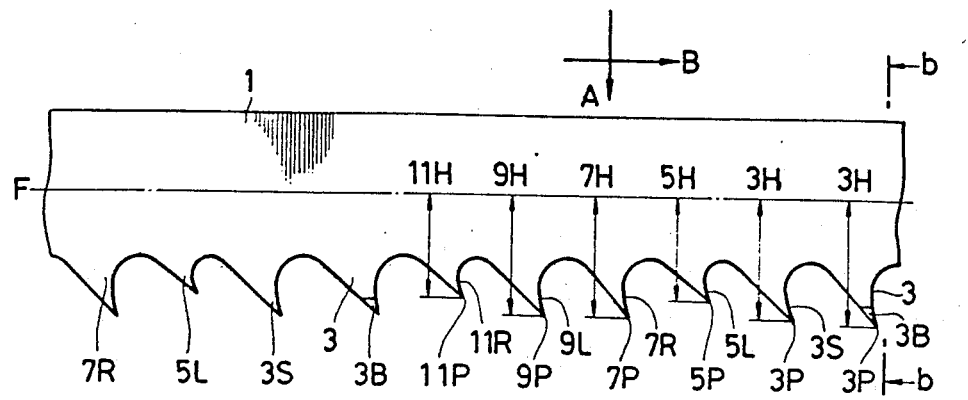
FIG.16(c)
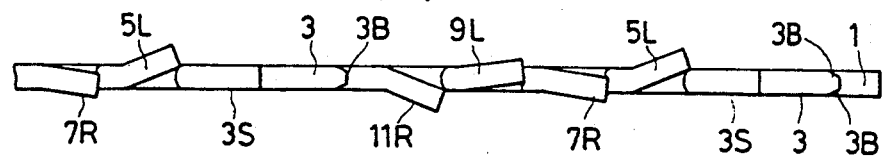
FIG.16(b)   FIG.16(d)   FIG.16(e)
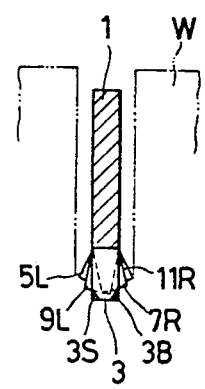 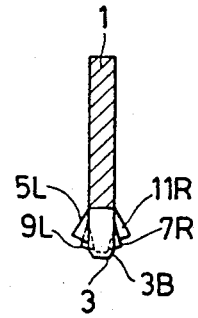 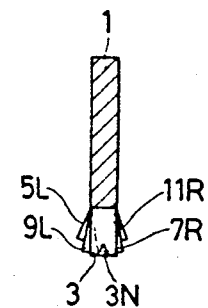

FIG.17(a)
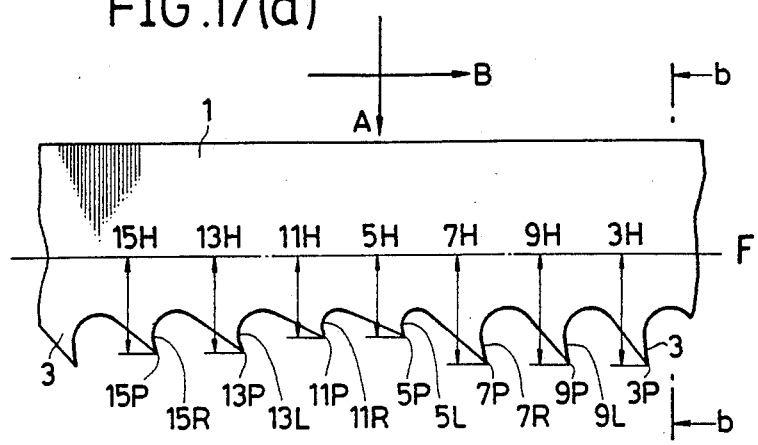
FIG.17(c)
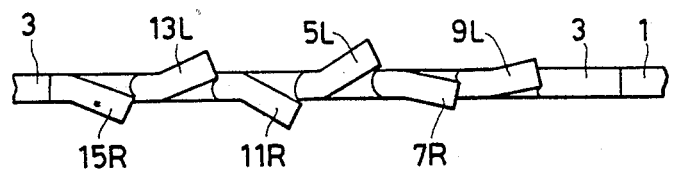
FIG.17(b)      FIG.18
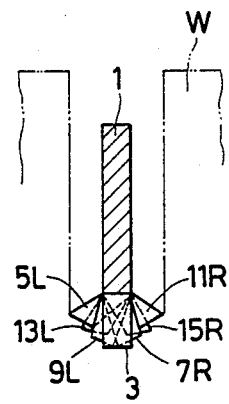 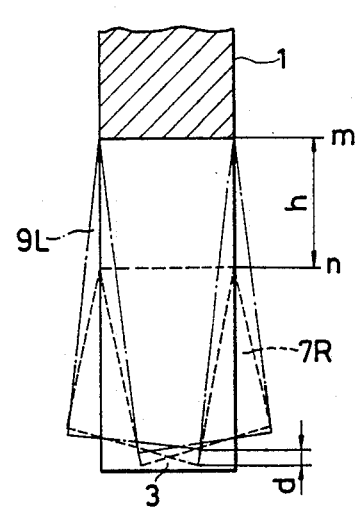

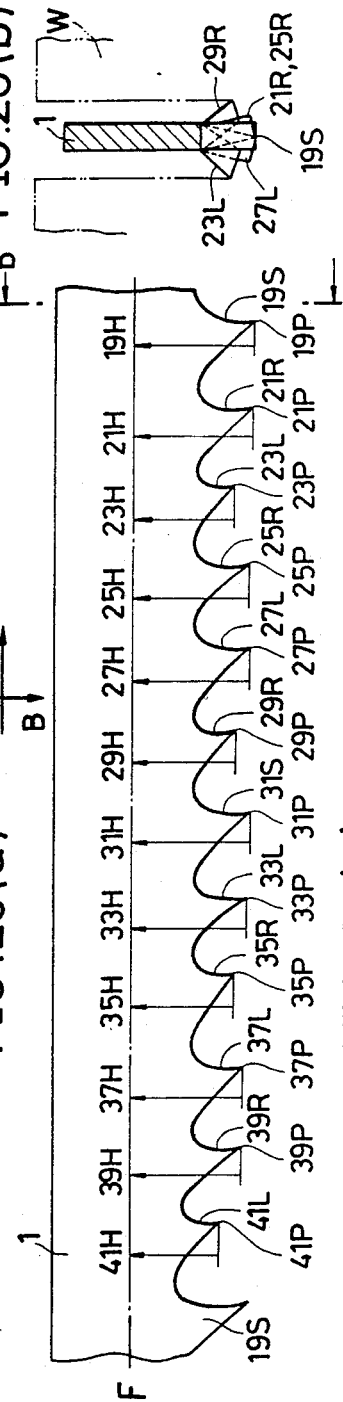

SAW BLADE

This is a division of co-pending application Ser. No. 087,392, filed on Aug. 18, 1987, now U.S. Pat. No. 4,827,822.

BACKGROUND OF THE INVENTION

1. Field of the Invention

The present invention relates to a saw blade, and in particular to a saw blade such as a bandsaw blade, a circular saw blade, and a hacksaw blade.

2. Description of the Prior Art

Conventionally, a metal cutting machine such as a bandsaw machine is used to cut a metallic workpiece. The bandsaw blade used by such a bandsaw machine is usually set in a pattern such as a raker set, wave set, or straight set pattern, and the like, in order to minimize vibration and noise, and, in addition, each tooth is set to an unequal pitch. Furthermore, bandsaw blades in which the height of each tooth is different have been developed for sawing difficult-to-cut materials such as stainless steel.

In conventional bandsaw blades, it is the usual practice, after each of the teeth have been formed at a uniform height, to set the pattern by combining teeth set in a slight bend in the direction of the thickness of the bandsaw blade (the transverse direction) with unset teeth which are not bent in the transverse direction.

When a workpiece is being sawn by a bandsaw blade, chips are produced which are almost the same thickness as the thickness of the backing of the bandsaw blade. This makes it very difficult to discharge these chips to the outside from the space between the groove formed by the sawing action in the workpiece and the backing of the bandsaw blade. Specifically, the chips have a tendency to collect in the gullet formed between the teeth of a conventional bandsaw blade. Once this gullet is filled with chips, these chips cause the bandsaw blade to be elevated in the feed direction of the cut relative to the workpiece. In proportion to the amount by which the bandsaw blade is elevated, it produces a course deviation to the right or left relative to its direction of travel. Accordingly, in conventional bandsaw blades the problem is produced by which the cut veers to the direction of the deviation.

In addition, in conventional bandsaw blades, when the blade continues to cut the workpiece after chips have collected in the gullet, the chips are compressed so that the problem arises whereby the pressure of the chips cause breakage of the saw teeth.

In conventional bandsaw blades, although there are slight differences in height between the tips of the unset teeth and the tips of the oppositely set teeth, for example, when taken from the locus of the center of the thick portion of the unset teeth, the tips of each tooth are almost the same height. Therefore, when the workpiece is being cut, the unset teeth are not always the first teeth to cut into the workpiece. The oppositely set teeth can also be the first to cut into the workpiece. For example, when the left-set teeth are the first to cut into the workpiece, the cutting resistance causes the bandsaw to have the inclination to swing to the right side. Specifically, there is the problem in a conventional bandsaw that vibration and deviation of the cut in the transverse direction is easily produced.

When stainless steel, which is a difficult-to-cut material, is being cut by a conventional bandsaw, the feeding force of each tooth is small. If the bandsaw blade cannot cut the workpiece, the tips of the bandsaw blade teeth will rub against the surface of the workpiece so that a work-hardened layer is formed on the surface, making the hard-to-cut material even more difficult to cut. Specifically, with conventional bandsaw blades, it is very difficult to provide one bandsaw blade which is capable of cutting all materials from easy-to-cut materials to hard-to-cut materials.

Conventionally, in a bandsaw blade developed for cutting difficult-to-cut materials, the teeth are made to have varying height in order to increase the feeding force of specific teeth. In a bandsaw blade for cutting difficult-to-cut materials, the longer or larger teeth only carry out the cutting of the workpiece, and the shorter or smaller teeth are usually not used. Accordingly, in this type of bandsaw blade the long teeth carry the major share of the load, and along with the problem of severe abrasion, the bandsaw blade which was cutting the workpiece is bent into the form of an arc. In the instant that it finishes cutting the workpiece, the disappearance of the resistance in the direction of the cut causes it to immediately revert to a straight line. Accordingly, if a small mass of material, which has not been cut, remains in the form of small protruding sections (burrs), then the short teeth, which for all practical purposes carried no load, strike the burrs so that the teeth are easily fractured.

In addition, in a bandsaw blade with teeth of different lengths, there is the problem that the inside corners of the tips of short teeth which are oppositely set, specifically the left corner of right-set teeth, and the right corner of left-set teeth looking from the direction of the cut, are obstructed by the long teeth and do no cutting whatever.

Also, in a sawblade with differing teeth heights it is usual to continuously join the short right-set teeth and left-set teeth. For this reason, there is also the problem that the long teeth which are positioned in the direction of the cut next to the oppositely set short teeth receive an especially large load.

In today's advanced technology, machine tools are required to be of high precision and high efficiency. In a bandsaw machine the precision of the cut is a big problem.

Specifically, there is a direct relationship between the bandsaw blade used and the accuracy of the cut of a bandsaw machine. In forming the configuration of the tips of the teeth of the bandsaw blades, it is usual to set the pattern in the direction of the thickness of the bandsaw blade (the transverse direction) by combining the bent, oppositely set teeth and the unset teeth which are not oppositely bent.

For example, a raker set pattern is formed from three kinds of teeth in one group (set) that is, a right-set tooth with the bend carried out in the right direction, a left-set tooth with the bend carried out in the left direction joined as a pair, and a unset tooth which is not bent in the left or right directions. It is usual that in the order in the direction of the advance of the blade, directly in front of the one unset tooth there is always a right-set tooth or, in the other case, a left-set tooth, prescribed in the same direction.

For example, when the cutting order of the teeth in a raker set is a right-set tooth, followed by a left-set tooth, then an unset tooth, the tooth before the unset tooth is always a left-set tooth, and a right-set tooth precedes a left-set tooth. Here, if taking the unset tooth as the base in the running direction of the saw blade, the distance from the unset tooth to the left-set tooth is one pitch and the distance from the unset tooth to the right set tooth is two pitches. Accordingly, because the saw blade descends at a fixed velocity during the sawing of the workpiece, the feeding amount into the workpiece is larger when the pitch is larger, and the load is also larger. Specifically, the left corner of the unset tooth cuts the portion remaining from the cut by the left-set tooth, and the right corner of the unset tooth cuts the portion remaining from the cut by the right-set tooth. Accordingly, the right corner of the unset tooth bears a greater load than the left corner, and the abrasion of the right corner of the unset tooth is greater than the abrasion of the left corner. This then gives rise to the problem of abrasion occurring on one side of the unset tooth so that a cut deviation is easily produced.

This problem not only occurs with the raker set, but is produced in all saw blades in which the configuration is always a right-set tooth or a left-set tooth immediately before one unset tooth.

At the present time, in the same way that a special bandsaw blade must be used for difficult-to-cut materials, it is necessary to classify bandsaw blades to be used depending on the material to be cut specifically for easy-to-cut materials, for large diameter materials, for small diameter materials etc.

SUMMARY OF THE INVENTION

A first object of the present invention is to provide, with due consideration to the drawbacks of such conventional devices, a saw blade which can produce finely divided chips when sawing a workpiece with a saw blade while improving the dischargeability of these chips, and in addition obtain an improvement in the cutting rate and life of the saw blade.

A second objective of the present invention is to provide a saw blade in which all teeth take part in cutting the workpiece, in which all teeth carry an equal load, and in which tooth breakage is minimize.

A third objective of the present invention is to provide a saw blade in which the vibration and deviation in the direction of the saw blade width is small.

A fourth objective of the present invention is to provide a saw blade in which all teeth take part in sawing the workpiece, in which a small load is borne by higher or larger teeth which are positioned next to shorter or smaller teeth, in which the load on each tooth is more uniform, in which abrasion occurs evenly, and in which deviation in the cut is difficult to produce.

A fifth objective of the present invention is to provide a saw blade in which, when cutting a workpiece, such as, for example, a round rod in which, just before the cut is completed, the length of the cut becomes short, or a workpiece such as shape steel or pipe, in which the length of the cut abruptly changes, the shock is small when the cut is completed and the length of the cut abruptly changes, and tooth breakage is not easily produced.

A sixth objective of the present invention is to provide a saw blade in which all materials, from difficult-to-cut materials to easy-to-cut materials can be cut with the same saw blade.

A seventh objective of the present invention is to provide a saw blade in which all materials from large diameter materials to small diameter materials can be cut with the same saw blade.

In order to accomplish these objects, in the present invention the trailing teeth which cut into the workpiece later are made shorter or smaller than the leading teeth which first cut into the workpiece, the bend to the left or right in the shorter or smaller teeth is larger than the bend to the left or right of the longer or larger teeth, so that the width of the set is larger in the smaller teeth, and a difference in level is provided for each tooth in the direction of the tooth height and the direction of the width of the set.

In addition, a plurality of trailing teeth are provided as a suitable number of pairs, which are pairs made up of a left-set tooth and a right-set tooth, and the tooth height from the base position to the tips of each pair of trailing teeth is the same size or smaller than the tooth height from the base position to the tips of the leading teeth. Also, the set width of the pairs of shorter teeth is larger than the set width of the pairs of longer teeth in the trailing teeth.

An eighth object of the present invention is to provide a saw blade in which deviation is minimized when the workpiece is being cut, and the abrasion of the tips of the teeth of the saw blade is uniform in relation to the total length of the saw blade.

In order to accomplish this object of the present invention, the cutting operation immediately before the unset teeth of the saw blade is performed repeatedly by a suitable number of either right-set teeth or left-set teeth, so that abrasion at the tips of the teeth of the sawblade is uniform along the entire periphery and it is difficult to produce a deviation.

BRIEF DESCRIPTION OF THE DRAWINGS

These and other objects, features and advantages of the present invention 1 become more apparent from the following description of embodiment taken in conjunction with the accompanying drawings, in which:

FIG. 1 (b) is a sectional drawing viewed along the line b—b in FIG. 1 (a).

FIG. 1 (c) is a bottom view of the bandsaw blade of FIG. 1 (a).

FIG. 2 (b) is a sectional drawing viewed along the line b—b in FIG. 2 (a). FIG. 2 (c) is a bottom view of the bandsaw blade of FIG. 2 (a). FIG. 3 (a) is a front elevation showing a third embodiment of the bandsaw blade of the present invention.

FIG. 3 (b) is a sectional drawing viewed along the line b—b in FIG. 3 (a).

FIG. 4 (a) is a front elevation showing a fourth embodiment of the bandsaw blade of the present invention.

FIG. 4 (b) is a sectional drawing viewed along the line b—b in FIG. 4 (a).

FIG. 4 (c) is a bottom view of the bandsaw blade of FIG. 4 (a).

FIG. 5 (a) is a front elevation showing a fifth embodiment of the bandsaw of the present invention.

FIG. 5 (b) is a sectional drawing viewed along the line b—b in FIG. 5 (a).

FIG. 5 (c) is a bottom view of the bandsaw blade of FIG. 4 (a).

FIG. 5 (d) is a sectional drawing showing a section of a sixth embodiment the present invention equivalent to the section shown FIG. 5 (b).

FIG. 5 (e) is a sectional drawing showing a section of a seventh of the present invention equivalent to the section shown in FIG. 5 (b).

FIG. 6 (a) is a front elevation showing an eighth embodiment of the blade of the present invention.

FIG. 6 (b) is a sectional drawing viewed along the line b—b in FIG. 6 (a).

FIG. 6 (c) is a bottom view of the bandsaw blade of FIG. 6 (a).

FIG. 7 (a) front elevation showing a ninth embodiment of the bandsaw blade of the present invention.

FIG. 7 (b) is a sectional drawing viewed along the line b—b in FIG. 7 (a).

FIG. 7 (c) is a bottom view of the bandsaw blade of FIG. 7 (a).

FIG. 7 (d) is a sectional drawing showing a section of a tenth embodiment of the present invention equivalent to the section shown in FIG. 7 (b).

FIG. 7 (e) is a sectional drawing showing a section of an eleventh embodiment of the present invention equivalent to the section shown in FIG. 7 (b).

FIG. 7 (f) is a sectional drawing showing a section of a twelfth embodiment of the present invention equivalent to the section shown FIG. 7 (b).

FIG. 8 (b) is a sectional drawing viewed along the line b—b in FIG. 8 (a).

FIG. 8 (c) is a bottom view of the bandsaw blade of FIG. 8 (a).

FIG. 9 (b) is a sectional drawing viewed along the line b—b in FIG. 9 (a).

FIG. 14 (b) is a sectional drawing viewed along the line b—b in FIG. 14 (a).

FIG. 14 (c) is a bottom view of the bandsaw blade of FIG. 14 (a).

FIG. 15 (b) is a sectional drawing viewed along the line b—b in FIG. 15 (a).

FIG. 16 (a) is a front elevation showing a twenty-first embodiment of the bandsaw blade of the present invention.

FIG. 16 (b) is a sectional drawing viewed along the line b—b in FIG. 16 (a).

FIG. 16 (c) is a bottom view of the bandsaw blade of FIG. 4 (a).

FIG. 16 (d) is a sectional drawing showing a section of a twenty-second embodiment of the present invention equivalent to the section shown FIG. 16 (b).

FIG. 16 (e) is a sectional drawing showing a section of a twenty-third of the present invention equivalent to the section shown in FIG. 16 (b).

FIG. 17 (a) is a front elevation showing a twenty-fourth embodiment of the bandsaw blade of the present invention.

FIG. 17 (b) is a sectional drawing viewed along the line b—b in FIG. 17 (a).

FIG. 17 (c) is a bottom view of the bandsaw blade of FIG. 17 (a).

FIG. 18 is an enlarged sectional drawing of a twenty-fifth embodiment of the present invention, and is an explanatory drawing of the position of the bend for setting the sawteeth.

FIG. 19 (b) is a sectional drawing viewed along the line b—b in FIG. 19 (a).

FIG. 19 (c) is a bottom view of the bandsaw blade of FIG. 19 (a).

FIG. 19 (d) is a bottom view of a bandsaw blade showing the status of the abrasion of the tips of each tooth.

FIG. 20 (a) is a front elevation showing a twenty-seventh embodiment of the bandsaw blade of the present invention.

FIG. 20 (b) is a sectional drawing viewed along the line b—b in FIG. 20 (a).

FIG. 20 (c) is a bottom view of the bandsaw blade of FIG. 20 (a).

FIG. 20 (d) is a sectional drawing showing a section of a twenty-eighth embodiment of the present invention equivalent to the section shown in FIG. 20 (b).

FIG. 20 (e) is a sectional drawing showing a section of a twenty-ninth embodiment of the present invention equivalent to the section shown in FIG. 20 (b).

DETAILED DESCRIPTION OF THE PREFERRED EMBODIMENT

Figure 1A:
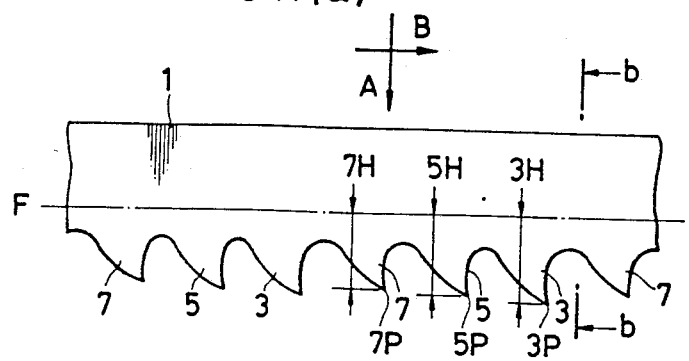
FIG. 1 (a) a front elevation showing one embodiment of the bandsaw blade of the present invention.

A preferred embodiment of the present invention is now explained with reference to the accompanying drawings, and examples are given of the case where the present invention relates to bandsaw blades. However, the present invention is not restricted to bandsaw blades, but can also be implemented for many other types of saw blades, such as circular saw blades, hacksaw blades, and the like.

Now referring to FIGS. 1 (a) to (c), a saw blade 1 basically comprises a group (set) of teeth made up of a leading tooth 3 which, when a workpiece W is being cut, proceeds in the direction of the cut to be made in the workpiece W (the direction of the arrow A in the drawings to cut the workpiece W, and a plurality of trailing teeth 5 and 7 which cut the workpiece W later than the leading tooth 3. For the leading tooth 3, in the case where, for example, the center of the width of the sawblade 1 is taken as the base position F (in the case of a circular saw blade, the center of the circle), the height 3H of the tooth from this base position F to the tip 3P of the tooth is formed larger than the heights 5H and 7H of a plurality of teeth 5 and 7 from the basic position F to the tips 5P and 7P of the teeth. The heights 5H and 7H of these trailing teeth 5 and 7 are different, with the tooth height 5H formed larger than the other tooth height 7H. Specifically, the leading tooth 3 and the trailing teeth 5 and 7 are formed with a difference in height in the direction in which the workpiece is cut, as is shown more clearly in FIG. 1 (b)

Figure 1B:
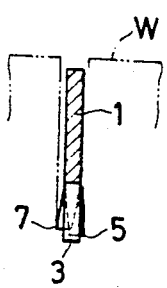
Figure 1C:
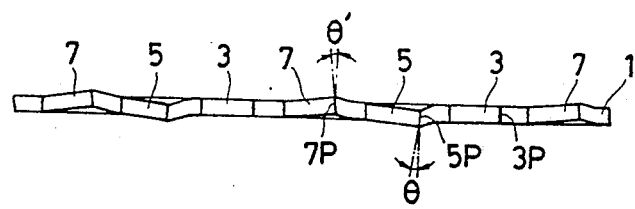

As is shown more clearly in FIG. 1 (b), the leading tooth 3 is formed as an unset tooth which is not bent in the direction of the width (hereafter referred to as the transverse direction) of the saw blade 1, in the case of viewing in the direction opposite to the running direction (the direction of the arrow B in the drawing) of the saw blade relative to the workpiece W. The trailing teeth 5 and 7 are bent in opposing directions and are formed as right-set and left-set teeth respectively.

With the saw blade 1 formed in the above fashion, when the workpiece W is being cut, the sawblade 1 moves in the direction of the cut to cut the workpiece W and on moving near to the workpiece W, first the leading tooth 3, which is the tooth with the greatest length (3H), cuts into the workpiece W. Next, the trailing tooth 5 with the next greatest length (5H), and then the following trailing tooth 7, cut into the workpiece. Specifically, the teeth cut into the workpiece W in order, beginning with the longest tooth.

The leading tooth 3 is an unset tooth so that, when this leading tooth 3 cuts into the workpiece W, it is not subjected to force components in the left and right directions, and cuts into the workpiece W in a straight line. Next, when the trailing tooth 5 cuts into the workpiece, because this trailing tooth 5 is a right-set tooth it cuts so that it widens the right side of the leading cut groove made by the leading tooth 3. In the same manner, the trailing tooth 7 cuts so that it widens the left side of the leading cut groove made by the leading tooth 3.

Specifically, with this embodiment of the present invention, the workpiece W is cut by the leading tooth 3 and the trailing teeth 5 and 7. Because the leading tooth 3 and the trailing teeth 5 and 7 cut the workpiece W together, the chips produced during the sawing action are of a small size.

As previously discussed, when the saw blade 1 is cutting the workpiece W, the trailing tooth 5, which is a right-set tooth, has a tendency to veer to the left as a result of the component of the cutting resistance. Moreover, because it is a set tooth, as shown in FIG. 1 (c), a side clearance angle θ (theta), slightly to the rear relative to the transverse direction, is formed because of the application of the component of the force in the transverse direction, and there is a tendency to cause a vibration in the transverse direction. In the same way, when the trailing tooth 7 cuts into the workpiece W there is also a tendency to cause a vibration in the transverse direction. Moreover, when the trailing teeth 5 and 7 cut into the workpiece W, the tip 3P of the leading tooth 3 does not receive a force component in the transverse direction but always cuts straight ahead in the direction of the cut, so that the vibration in the transverse direction from the trailing teeth 5 and 7 is suppressed, and the trailing teeth 5 and 7 are always guided straight ahead by the leading cut groove which is formed by the tip 3P of the leading tooth 3. Accordingly, the ability to cut straight forward is better than that found conventionally, and a cut is obtained with only a small deviation.

Figure 2A:
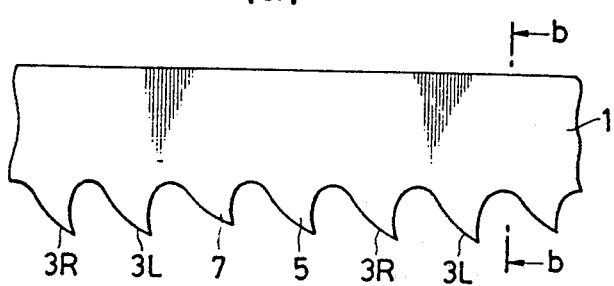
FIG. 2 (a) is a front elevation showing a second embodiment of the bandsaw blade of the present invention.
Figure 2B:
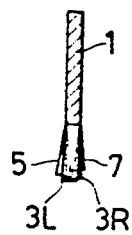
Figure 2C:
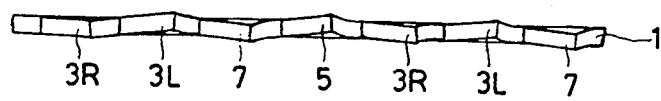

The above embodiment was explained in the case where the leading tooth 3 is an unset tooth However, it is possible, as shown in FIGS. 2 (a) to (c), to have a pair of transverse set teeth 3L, 3R, very slightly bent in the transverse direction but otherwise formed the same as in the embodiment shown in FIGS. 1 (a) to (c). Furthermore, in FIGS. 2 (a) to (c), the case is shown where the trailing teeth 5, 7 are set in the opposite direction to the case of the example shown in FIGS. 1 (a) to (c). In the configuration of this embodiment, the function and effect obtained are the same as for the previous embodiment.

In addition, in the case of the configuration in which a plurality of tips 3C, 5C, and 7C with fantail-shaped cross-sections are fixed to each tooth 3, 5, and 7 of the saw blade 1, in a plectrum shape as shown in FIGS. 3 (a) and (b), the height of each tip 3C, 5C, and 7C differs, and by means of the configuration where the smaller the height the greater the width of the tip, the function and effect obtained are the same as for the previous embodiment.

In the previous embodiments, in order that the leading tooth 3 and the trailing teeth 5 and 7 have different heights 3H, 5H and 7H, it is possible to form the teeth heights 3H, 5H, and 7H in suitable stages at different heights by forming the tips of the teeth 3, 5, and 7, for example, with a cutter, or by a means where the tips of the teeth are suitably bent by a striking force in the running direction of the saw blade. Further, as shown in FIG. 4 (a), it is desirable to have the configuration whereby the tip 3P of the leading tooth 3 and the tips 5P and 7P of the trailing teeth 5 and 7 are positioned on a straight line suitably inclined to the running direction B of the saw blade 1, or are positioned on an arc of a circle with a suitable radius R. In this way, a configuration where the tips 3P, 5P, and 7P of the teeth 3, 5, and 7 are positioned on a straight line or on an arc, is easily formed by making the teeth 3, 5, and 7 of equal height, setting the trailing teeth 5 and 7 by bending in the transverse direction, after which, as shown in FIG. 4 (b), they are subjected to a grinding process by means of a grinding wheel GW whose center is set on the centerline of the thickness of the saw blade 1.

In the above manner, it is desirable to grind the tips 3P, 5P, and 7P of the teeth 3, 5, and 7 by means of the grinding wheel GW, to form a plurality of comparatively large flanks 5r and 7r on the trailing teeth 5 and 7, to strengthen the tips 5P and 7P. In addition, the tips 3P, 5P, and 7P of the teeth 3, 5, and 7, as is clearly shown in FIG. 4 (b), become the form of an arc which has its center on the centerline L of the width of the saw blade 1, which improves the centripetal tendency and improves the marking-off operation of both angles of the tip 3P of the tooth 3, and further improves the tendency to travel straight ahead. In addition, as clearly shown in FIG. 4 (c), the side clearance angles θ, θ' of the tips 5P, and 7P of the trailing teeth 5, and 7 shown in FIG. 1 (c) become small, and the tendency to veer in the transverse direction, and the tendency to cause vibration also become small.

The explanations of the above embodiments were made for the case where there is either one unset leading tooth 3 or a pair of set teeth with a very slight bend in the transverse direction, along with two trailing teeth 5 and 7 set in the transverse direction, making up one group of teeth. However, the number of teeth in one such group is optional. For example, any desired number of teeth ... such as 4, 5, 6, 7, 8, 9 ... can be selected to form a group, and the difference in height and difference in set width between the teeth can be suitably formed.

FIGS. 5 (a) to (c) show a saw blade in which there are four teeth in a group. In the saw blade 1, both corners of the leading tooth 3 are ground and an inclined section 3B, of which both sides are inclined at the same inclination, is formed. In the example, the tip of the leading tooth 3 is shown to be formed in almost a V-shape In this embodiment of the present invention, one group comprises the leading tooth 3 with a height 3H, and a second leading tooth 3S with the same dimension, along with a pair of trailing teeth 5 and 7. The second leading tooth 3S may also have a height which is slightly less than that of the leading tooth 3. By the formation of the inclined section 3B at the tip of the leading tooth 3, the remaining uncut section is therefore cut.

Specifically, by means of this embodiment, when the workpiece is being cut by the leading tooth 3, chips are produced which are thinner than the width of the leading tooth 3, and when the workpiece is being cut by the second leading tooth 3S, chips are produced which are proportionate to the remaining uncut section due to the inclined section 3B of the leading tooth 3. The size-reduction of these chips is improved, and the ease-of-discharge of the chips from the teeth 3, 3S, 5, and 7 is improved. In addition, the leading tooth 3 and the second leading tooth 3S are not subjected to a force component in the transverse direction but cut straight ahead in the direction of the cut. The action and effect are the same as for the previous embodiment Incidentally, although it is desirable that the second leading tooth 3S be provided to produce chips which are even more finely divided, the second leading tooth 3S is not absolutely necessary. For example, as shown in FIG. 5 (d), it is possible to eliminate the second leading tooth 3S. In addition, in this embodiment of the present invention, the heights 5H and 7H of the trailing teeth 5 and 7 are shown as being identical, for the purpose of illustration. However, these heights may also be different. Also, as in the previous embodiment, the tips of the teeth 3, 3S, 5, and 7 can be formed on the arc of a circle. Furthermore, to give more finely divided chips, it is possible to use a number of configurations, such as a U-shaped or V-shaped notch 3N in the tip of the leading tooth 3, as shown in FIG. 5 (e). In this case, the V-shaped portion which remains uncut as a result of the formation of the notch 3N is cut by the second leading tooth 3S.

As indicated above, in order that when the chips are finely divided, the discharge of the chips is improved, it is desirable to mutually provide a chips removal channel 11, extending over the body of the saw blade 1 in the lower part of the gullet G of the teeth 3, 3S, 5, and 7 as shown in FIGS. 6 (a) to (c). It is desirable that the chips removal channel 11 be provided to correspond with the direction of set of the set teeth. In the case of a right-set tooth, for example, the chips removal channel 11 should be formed on the right side of the body of the saw blade 1. It is also desirable that the chips removal channel be formed in a direction slightly inclined relative to the cutting direction of the saw blade 1 in the opposite direction of the running direction of the sawblade 1.

FIGS. 7 (a) to (c) illustrate an embodiment of the present invention in which five teeth form one group. This group comprises the leading tooth 3, a right-set tooth 3R and a left-set tooth 3L which had the same height as the leading tooth 3 in the condition before they are bent left or right for setting, and a pair of trailing teeth 5 and 7. Although the heights of the set teeth 3R and 3L may be the same, they may also differ as shown in FIG. 7 (d). In addition, the heights of the trailing teeth 5 and 7 may also differ. The tip of the leading tooth 3 may be formed in a V-shape, as in a previous embodiment, or it may be formed as an arc of a circle. It is also possible to provide a notch in the tip of the tooth.

In a possible configuration for a group of five teeth, in the case where the tip of the leading tooth 3 is formed almost in a V-shape, as shown in FIG. 7 (e), the tip of an unset tooth 13, which is the next highest tooth to the leading tooth 3, is formed in a V-shape wider than that of the leading tooth 3. Also, an unset tooth 15, which is the third highest tooth in the group, is provided, as well as the trailing teeth 5 and 7.

Furthermore, as shown in FIG. 7 (f), in the case where the notch 3N is formed in the tip of the leading tooth 3, it is desirable to provide a plurality of pairs of suitable trailing teeth 5R, 5L, 7R, 7L to cut the portion of the workpiece which is left by the notched section 3N.

Figure 8A:
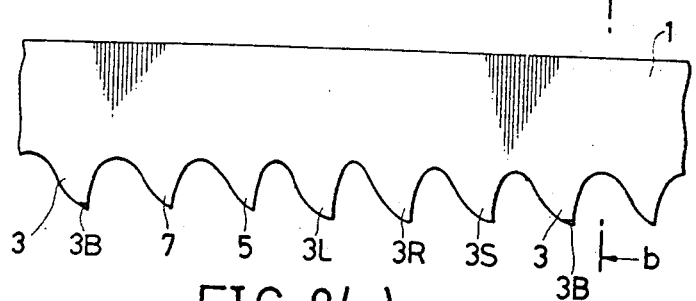
FIG. 8 (a) is a front elevation showing a thirteenth embodiment of bandsaw blade of the present invention.
Figure 8B:
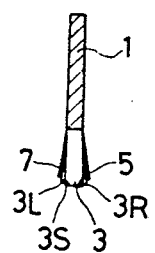
Figure 8C:
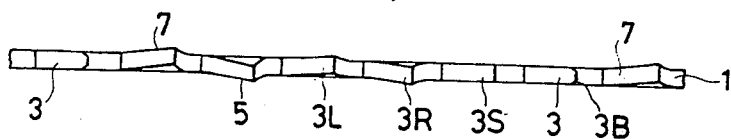

FIGS. 8 (a) to (c) show one group made up of six teeth —the leading tooth 3, the second leading tooth 3S, the opposedly set teeth 3R and 3L, and the trailing teeth 5 and 7 —in which the tip of the leading tooth 3 is formed almost in a V-shape. In this embodiment also, the shorter trailing teeth 5 and 7 are formed with a rather large set width, and each of these teeth is different in height and in set width. All these teeth are formed to carry out a cutting action. Specifically, the load on each tooth is equal, and the chips are reduced in size so that discharge of the chips is improved.

Figure 9A:
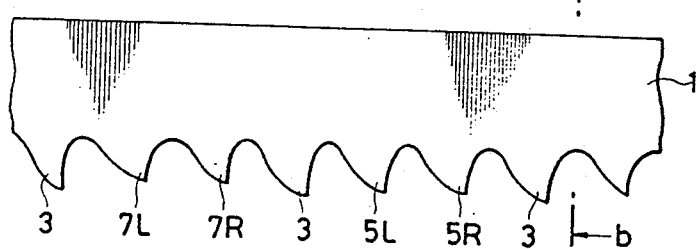
FIG. 9 (a) is a front elevation showing a fourteenth embodiment o bandsaw blade of the present invention.
Figure 9B:
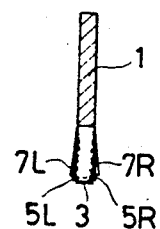

FIGS. 9 (a) and (b) show a different type of six-tooth group. This group comprises the leading tooth 3, the pair of trailing teeth 5R, 5L of medium height, and the pair of trailing teeth 7R, 7L, which have the smallest height, positioned in the appropriate order.

Figure 10:
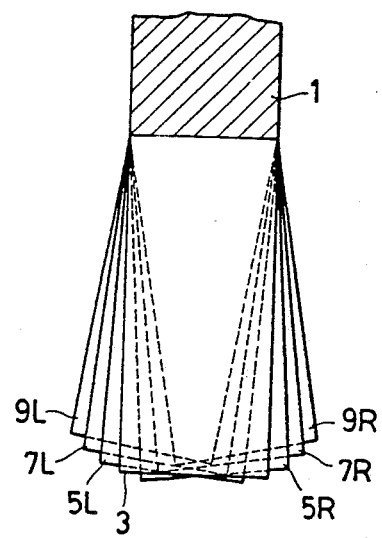
FIG. 10 is an enlarged sectional drawing of a fifteenth embodiment o present invention, showing one example of a group of seven teeth.
Figure 11:
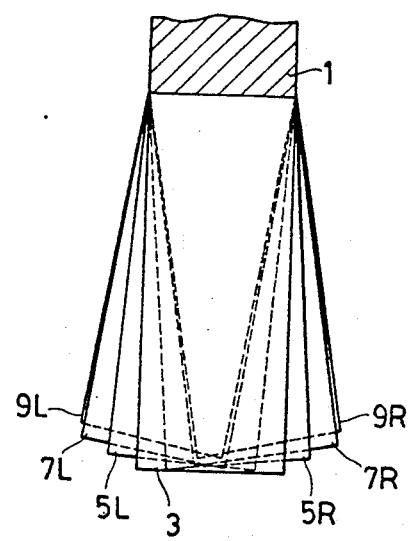
FIG. 11 is an enlarged sectional drawing of a sixteenth embodiment of present invention, showing a modification of the example of FIG. 10.
Figure 12:
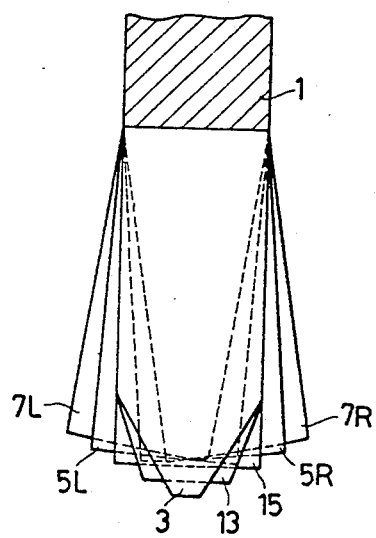
FIG. 12 is an enlarged sectional drawing of a seventeenth embodiment of the present invention, showing one more modification of an example of a group of seven teeth.

FIGS. 10 to 12 show the cross-section of a saw blade in which a group contains seven teeth, and in which the pairs of shorter trailing teeth are formed with a rather wider set. In addition, in FIG. 11, the width of the set of the pair of trailing teeth 7R, 7L and the width of the set of the pair of trailing teeth 9R, 9L are the same In this embodiment of the present invention, the trailing teeth 9R, 9L perform the finishing cut. Specifically, because the trailing teeth 7R, 7L are set teeth, they have a tendency to veer slightly to the inner direction while the cut is being made, and the last trailing teeth 9R, 9L cut the section equivalent to the amount of this veering. In this embodiment the heights of the trailing teeth 7R, 7L and the trailing teeth 9R, 9L are different, but it is possible to make them the same.

The embodiment shown in FIG. 12 is the embodiment of FIG 7 (e) with two trailing teeth added.

Figure 13:
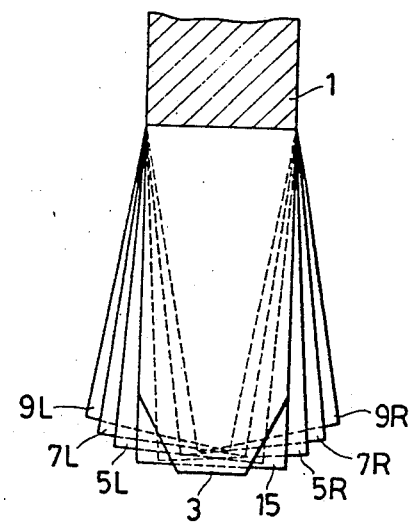
FIG. 13 is an enlarged sectional drawing of an eighteenth embodiment of the present invention, showing one example of a group of eight teeth.

FIG. 13 shows an embodiment of the present invention in which eight teeth comprise one group. The tip of the leading tooth 3 is shown formed in almost a V-shape. This embodiment is equivalent to the embodiment of FIG. 10 with the tip of the leading tooth in the V-shape added.

In effect, in all of these embodiments there is a difference in height between the leading tooth and the plurality of trailing teeth. There is also a difference in the width of the set, and the configuration is such that all the teeth perform a cutting action. According to experiments, it is desirable to have a difference of 0.04 mm or more between the heights of the teeth and between the widths of the set on one side, for most effective cutting.

As is made clear in the explanation of the above embodiments, in the present invention there is a difference between the heights of the leading teeth of the saw blade and the heights of the trailing teeth. The shorter trailing teeth have a rather wider set, whereby these set widths are different.

Accordingly, when a workpiece is cut by a saw blade of the present invention, all the teeth on the saw blade participate in the cutting action, and the chips produced during the cutting are reduced in size, so that the cutting rate is improved and the load on each tooth is equal.

From the fact that all the teeth do the cutting and there is an equal load on each tooth, no tooth receives a concentrated load, and when the length of the cut is abruptly reduced, the shock is small. The amount of tooth breakage is small, and each tooth receives a uniform amount of abrasion, so that the life of the saw blade is extended.

In addition, because there is a difference in the heights of the leading tooth and the plurality of trailing teeth in the saw blade, the higher leading tooth does not receive a force component in the transverse direction and always cuts straight ahead, so that its ability to cut straight ahead is improved. Accordingly, the deviation and vibration of the saw blade in the direction transverse to the line of cut is extremely small in comparison to conventional saw blades.

From the fact that the load is applied uniformly to each of the teeth, the load is apportioned to each tooth when the workpiece is being cut. Accordingly, the load on each tooth is comparatively small so that difficult-to-cut materials can also be handled, and the same saw blade can be used to saw difficult-to-cut materials and easy-to-cut materials.

In addition, all the teeth in the saw blade cut the workpiece, and the chips produced when the workpiece is cut are extremely finely divided so that the discharge of these chips from the space between the body of the saw blade and the channel of the cut is improved. Therefore, the chips do not collect in the gullets between the teeth, making it possible to easily perform a long cut in a workpiece. The same saw blade can be used to cut any size of workpiece from small diameter to large diameter.

The present invention is not limited to the previously described embodiments but by making suitable changes can be implemented in other forms. For example, it is possible to respectively combine suitable elements such as: making the arrangement of the leading tooth and the plurality of trailing teeth in a varied order; making the tips of all teeth in the form of an arc; making the leading tooth almost V-shaped and forming a notch in the tip; forming a cutting removal channel in the gullet; and positioning the tips of the leading tooth and the trailing teeth in stepped form, in straight-line form, or in the form of the arc of a circle. If required, the pitch of the teeth can be suitably changed.

Figure 14A:
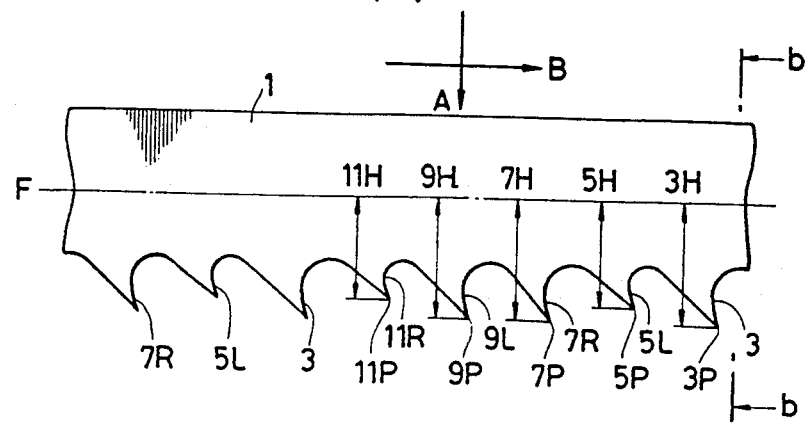
FIG. 14 (a) is a front elevation showing a nineteenth embodiment of bandsaw blade of the present invention.
Figure 14B:
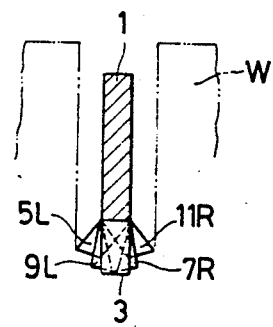
Figure 14C:
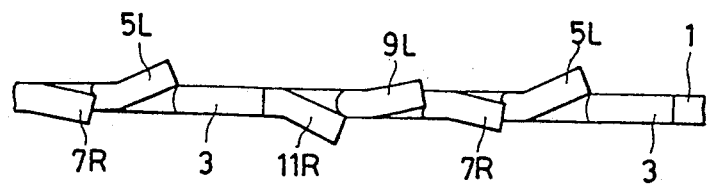

Now referring to FIGS. 14 (a) to (c), the saw blade 1, as a still further embodiment of the present invention, is provided with a group (set) of teeth comprising the leading tooth 3 and a right-set tooth 7R and a left-set tooth 9L which are first trailing teeth which perform the cutting of a first stage leading channel widening cut, and a left-set tooth 5L and a right-set tooth 11R which are second trailing teeth which perform the cutting of a second stage leading channel widening cut.

The leading tooth 3 has a height of 3H from the basic position F to the tip 3P of the tooth, which height is larger than the heights 5H, 11H of the second trailing teeth 5L, 11R from the basic position F to the tips 5P, 11P. The heights 7H, 9H of the first trailing teeth 7R, 9L from the basic position F to the tips 7P, 9P are the same as the height 3H of the leading tooth 3. However, the heights 7H, 9H may also be less than the height 3H of the leading tooth 3.

Specifically, the leading tooth 3 and the first trailing teeth 7R, 9L, and the second trailing teeth 5L, 11R, as is clearly shown in FIG. 14 (b), are formed at different levels in the direction of the line of cut of the workpiece.

In this embodiment of the present invention, the second trailing teeth 5L, 11R are the shortest teeth, and, as clearly shown in FIG. 14 (a), because they are not positioned consecutively, the first trailing tooth 7R and the leading tooth 3, which are high teeth and follow the second trailing teeth 5L, 11R, bear a load corresponding to one pitch between the leading tooth and the short second trailing tooth. Accordingly, comparing with the two consecutive short trailing teeth bear a load corresponding to two pitches, the load is comparatively reduced.

Figure 15A:
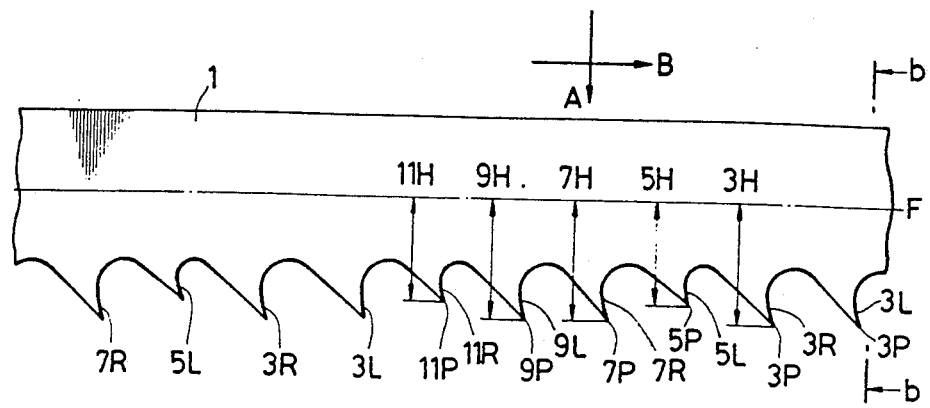
FIG. 15 (a) is a front elevation showing a twentieth embodiment of the bandsaw blade of the present invention.
FIG. 15(c) is a bottom view of the bandsaw blade of FIG. 15 (a).
Figure 15B:
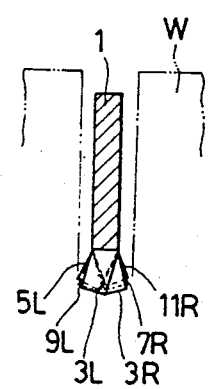
Figure 15C:
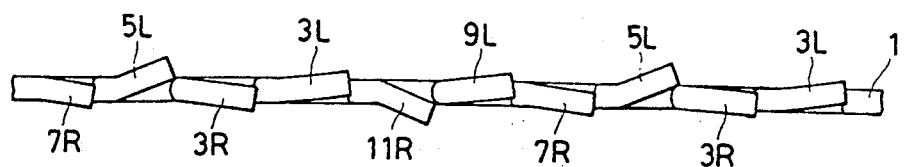
Figure 19A:
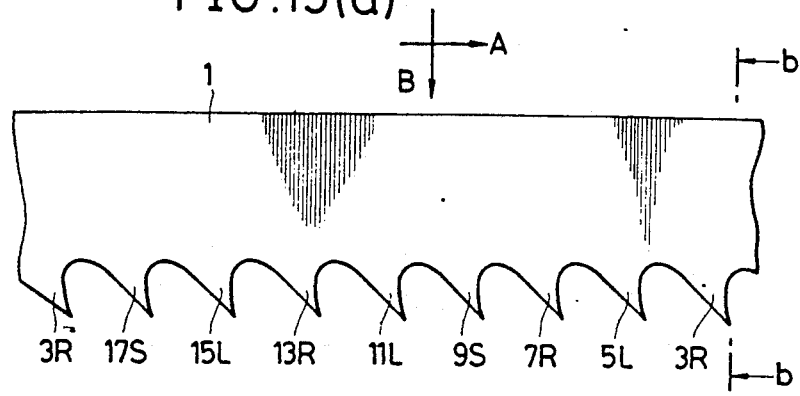
FIG. 19 (a) is a front elevation showing a twenty-sixth embodiment of the bandsaw blade of the present invention.
Figure 19B:
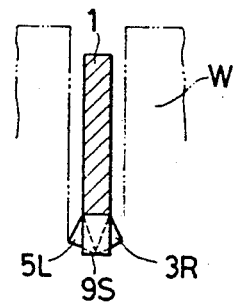
Figure 19C:
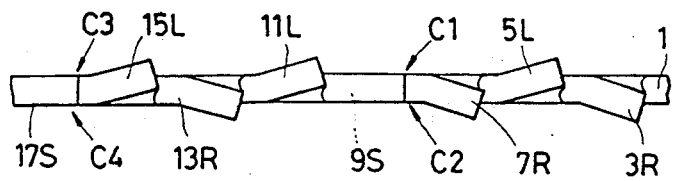
Figure 19D:
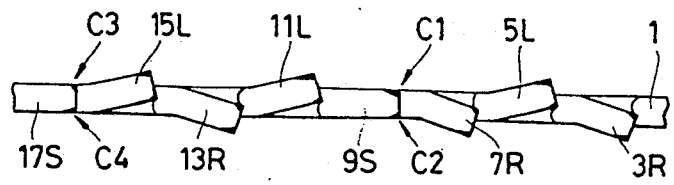

This embodiment was explained for the case where the leading tooth 3 is an unset tooth. However, as shown in FIGS. 15 (a) to (c), it is possible for this embodiment to have a configuration wherein, instead of one unset tooth, there is a pair of set teeth 3L, 3R set very slightly in opposing directions, while the rest of the embodiment is the same as the embodiment illustrated in FIGS. 14 (a) to (c).

The action and effect of the embodiment with this configuration is exactly the same as the previous embodiment.

FIGS. 16 (a) to (c) show a saw blade in which there are six teeth in a group. In the saw blade 1, both corners of the leading tooth 3 are ground and an inclined section 3B of which both sides are inclined at the same inclination is formed. In the example, the tip of the leading tooth 3 is shown to be formed in almost a V-shape. In this embodiment of the present invention, one group comprises the leading tooth 3 with a height 3H, and a second leading tooth 3S with the same dimension along with two pairs of trailing teeth 7R, 9L and 5L, 11R. The second leading tooth 3S, which may also have a height which is slightly less than that of the leading tooth 3, can cut the remaining section which is remained uncut due to the inclined section 3B formed at the tip of the leading tooth 3.

Specifically, by means of this embodiment, when the workpiece is being cut, chips corresponding to the width of the tip of the V-shaped section are produced, and when the workpiece is being cut by the second leading tooth 3S, chips corresponding to the portion left uncut due to the inclined portion 3B are produced. The reduction to small size of these chips is further improved, and the ease-of-discharge of the chips is further improved. In addition, the leading tooth 3 and the second leading tooth 3S are not subjected to a force component in the transverse direction but always cut straight ahead in the direction of the cut so that the ability to cut straight ahead is improved. The action and effect are the same as for the previous embodiment. Incidentally, although it is desirable that the second leading tooth 3S be provided to produce chips which are even more finely divided, the second leading tooth 3S is not absolutely necessary. For example, as shown in FIG. 16 (d), it is possible to eliminate the second leading tooth 3S. Furthermore, as a configuration to promote more finely divided chips, as shown in FIG. 16 (e), it is possible to form a notch or notches 3N in the tip of the leading tooth 3. This notch may take a suitable form such as a V- or U-shape. In this case, the second leading tooth 3S cuts the portion that is left uncut because of the formation of the notch 3N.

Now referring to FIGS. 17 (a) to (c), when the saw blade 1 basically cuts the workpiece W, in the direction of the cut into the workpiece W (the direction of the arrow A in the drawing), the leading tooth 3 which performs the cutting of the workpiece and the first trailing teeth 9L, 7R which perform the cutting of a first stage leading channel widening cut, and the second trailing teeth 5L, 11R which perform the cutting of a second stage leading channel widening cut, and a plurality of third trailing teeth 13L, 15R which work as buffer teeth to reduce the load on the leading tooth 3 (unset tooth), are provided as one group (set). The third trailing teeth 13L, 15R, in the case where, for example, the basic position F is the center of the width of the saw blade 1, are formed at medium heights of 13H and 15H from the basic position F to the tips 13P and 15P, placing them between the second trailing teeth 5L, 11R which have heights of 5H and 11H from the basic position F to the tips 5P and 11P, and the leading tooth 3 which has a height of 3H from the basic position F to the tip 3P. The teeth heights 5H and 11H may be the same or may differ. In addition, the teeth heights 13H and 15H may also be the same or may differ.

With the prerequisite that the magnitude of the set of the buffer teeth 13L, 15R is smaller than or the same as that of the second trailing teeth 5L, 11R, these teeth can be set optionally. In addition, they can be unset teeth which are not bent transversely.

Specifically, in the case where the cutting order of the saw blade goes from the shorter tooth to the higher tooth, a medium-height buffer tooth is provided between the shorter tooth and the higher tooth to moderate the shock on the following tooth.

Now referring to FIG. 18, this embodiment of the saw blade of the present invention shows one example of a saw blade provided with a group of the leading tooth 3 which, when the workpiece W is being cut, carries out the leading cut in the line of cut of the workpiece, and a plurality of trailing teeth 7R and 9L, which cut into the workpiece later than the leading tooth 3 and whose function is to widen the leading cut groove made by the leading tooth 3. The heights of the trailing teeth 7R, 9L are less than the height of the leading tooth 3 from the basic position to the tip of the tooth.

Here, the broken line shows the case where the set of the trailing tooth is performed from the bend position m, and the dashed line shows the case where the set is performed from the bend position n closer to the tooth tip. In addition, the magnitude of the set of the teeth 7R, 9L is the same, and the tooth shown by the dashed line and the tooth shown by the broken line are formed at the same height before performing the setting.

As clearly shown in FIG. 18, the tooth which is set from a bend-point n, which is close to the tip, has a larger tooth tip inside corner section, which is the tooth tip corner section in the direction opposite to the setting direction, than the tooth which is set from a bend point m which is farther away from the tip, and that tooth is longer by the length d.

In short, in the case where the feeding amount of the leading tooth 3 is large, the tooth which is set from the bend-point n has an inside tip corner which will do more work than one set from the bend-point m, and a buffering effect against the load produced on the leading tooth 3 is obtained from this tooth itself.

In this example, leading tooth or teeth 3 are shown unset. However, if the leading tooth or teeth were set, it would be preferable to set the bending position closer to the tip in the trailing tooth which has the greatest amount of set and the shortest length of tooth, than in the tooth with a small magnitude of set.

As may be understood from the foregoing explanation, in this embodiment, the trailing teeth are provided so that two shorter teeth are not positioned consecutively, and the cut by the higher tooth which carries out the subsequent cut in the running direction of the saw blade is of a magnitude at which the saw blade lowers during the movement of two-pitch length corresponding to one shorter or smaller tooth. The load produced on the higher or larger tooth which makes the cut subsequent to the shorter or smaller tooth is smaller when compared to that of conventional saw blades.

In addition, in this embodiment, in the case where the cutting sequence is from the short tooth to the high tooth, the load on the high tooth can be reduced in comparison with a conventional load by provision of a trailing tooth of medium height to function as a buffer tooth between the short tooth and the long tooth.

Furthermore, in the present invention, the set bend-point for a shorter tooth with maximum magnitude of set is positioned closer to the tip of the tooth than the bend-point for one with a smaller amount of set, so that the inside corner of such a tooth performs more work, and an effective buffering action against the load produced on the high tooth is provided by the tooth itself.

In all cases of the present invention, there is a difference in height and in set width between the leading tooth and the plurality of trailing teeth, and all teeth contribute to making the cut in the workpiece. Accordingly, the chips are reduced to small size and their ease-of-discharge is improved, and the cutting rate is improved. Also, the short teeth are positioned non-consecutively, and, the provision of buffering teeth reduces the load on the leading teeth, which has a considerably large effect on the ability of the saw blade to cut in a straight line. Accordingly, the load applied against each tooth becomes more uniform, so that uniform abrasion occurs, the saw blade is more resistant to veering from a straight cut, and the life of the blade is extended.

In addition, with the saw blade of the present invention, because the load on each tooth is uniform, and the cut is performed in a balanced manner so that no work done by a transversely set tooth is wasted, any movement in the direction of the width of the tooth is small. It therefore becomes possible to saw easy-to-cut materials and difficult-to-cut materials using the same saw blade. Furthermore, the chips produced with the saw blade of the present invention are finely divided which has the effect of improving their dischargeability, and both large diameter and small diameter materials can be cut with one type of saw blade.

The method used to reduce the load on the heavily loaded teeth in the saw blade of the present invention can be applied in practice to all saw blades.

Now referring to FIGS. 19 (a) to (d), the saw blade 1 is comprised of the right-set teeth 3R, 7R, 13R, the left-set teeth 5L, 11L, 15L, and the unset teeth 9S, 17S for cutting the workpiece W as one group (set) of eight teeth.

These teeth perform the cutting in the following order-right-set tooth 3R, left-set tooth 5L, right set tooth 7R, unset tooth 9S, left-set tooth 11L, right-set tooth 13R, left-set tooth 15L, and unset tooth 17S. With the saw blade 1 shown in this example, in the order of the running direction of the saw blade 1 (the direction of the arrow A) when the workpiece W is being cut, the tooth directly preceding the unset tooth 9S is the right-set tooth 7R, and the tooth directly preceding the unset tooth 17S is the left-set tooth 15L.

Specifically, in the order of the direction of the advance of the saw blade 1 (the direction of the arrow A), the teeth immediately preceding an unset tooth are positioned to avoid having all with the same direction of set, such as right-set followed by right-set, or left-set followed by left-set, and the tooth immediately preceding the unset tooth is right-set or left-set, equally alternated in the direction of the length of the saw blade.

As one group of the saw blade 1 shown in FIGS. 19 (a) to (d), there are a total of three right-set teeth —3R, 7R, and 13R —and a total of three left-set teeth —5L, 11L, and 15L. The balance in the tranverse direction is therefore equal, and, as previously discussed, the tooth in the position immediately preceding the unset tooth 9S is the right-set tooth 7R. Also, the tooth in the position immediately preceding the unset tooth 17S is the left-set tooth 15L. Therefore, the positioning in the order of the running direction of the saw blade 1 (the direction of the arrow A), is such that the teeth immediately preceding an unset tooth are positioned to avoid having all with the same direction of set. Specifically, in this embodiment of the present invention, the patterns formed by the unset tooth 9S and the teeth immediately before and after are as follows. First, there is a first pattern, consisting of the three teeth in the order "right-set, unset, left-set," in this case, 7R, 9S, 11L. Then, there is a second pattern in the order "left-set, unset, right-set," in this case, 15L, 17S, 3R. The first and second patterns are positioned alternately, and a suitable number of teeth are suitably positioned between the first pattern and the second pattern.

Accordingly, the abrasion at the tips of these teeth is as shown in FIG. 19 (d). Specifically, the abrasion at the left corner C1 of the unset tooth 9S is large in comparison with the abrasion at the right corner C2, and the abrasion at the right corner C4 of the unset tooth 17S is large in comparison with the abrasion at the left corner C3, so that the left and right abrasion over the entire periphery of the saw blade 1 is uniform.

This embodiment was explained using one group (set) of eight teeth comprising three right-set teeth, which are bent in the right direction, three left-set teeth, which are bent in the left direction, and two unset teeth which are not bent transversely. However, one group of six teeth could also be used, with the teeth arranged in the order —right-set tooth, left-set tooth, unset tooth, left-set tooth, right-set tooth, and unset tooth, in the running direction of the saw blade. It is also possible to have the order —right-set tooth, left-set tooth, right-set tooth, unset tooth repeated in the running direction of the saw blade, followed by the order —left-set tooth, right-set tooth, left-set tooth, unset tooth, repeated.

Now referring to FIGS. 20 (a) to (c), basically, when the saw blade 1 is cutting into the workpiece W, this configuration has one set of twelve teeth whose order, in the direction of the cut into the workpiece W (the direction indicated by the arrow B in the drawing), is the unset tooth 19S, the right-set tooth 21R, the left-set tooth 23L, the right-set tooth 25R, the left-set tooth 27L, the right-set tooth 29R, the unset tooth 31S, the left-set tooth 33L, the right-set tooth 35R, the left-set tooth 37L, the right-set tooth 39R, and the left-set tooth 41L.

The unset teeth 19S and 31S, in the case, for example, when the basic position F is the center of the saw blade 1, measure 19H and 31H in height from the basic position F to the tips 19P and 31P, which is higher than the left-set tooth 23L, the right-set tooth 29R, the right-set tooth 35R, and the left-set tooth 41L which measure 23H, 29H, 35H, and 41H from the basic position F to the tips 23P, 29P, 35P, and 41P. The heights 21H, 25H, 27H, 33H, 37H, and 39H from the basic position F to the tips 21P, 25P, 27P, 33P, 37P, and 39P of the right-set tooth 21R, the right-set tooth 25R, the left-set tooth 27L, the left-set tooth 33L, the left-set tooth 37L, and the right-set tooth 39R are the same as the heights 19H, 31H of the unset teeth 19S and 31S. Furthermore, the heights 21H, 25H, 27H, 33H, 37H, and 39H could also be shorter than the heights 19H, 31H of the unset teeth 19S and 31S.

Also, the sets of the left-set teeth 23L, 41L and of the right-set teeth 29R and 35R are greater than those of the left-set teeth 27L, 33L, 37L and of the right-set teeth 21R, 25R, 39R. Specifically, as more clearly shown in FIG. 20 (b), there is a difference in height in the direction of the cut into the workpiece W and in the direction of the set width.

When the workpiece W is cut by means of the saw blade 1 of the above configuration, the highest (19H) unset tooth 19S is the first to cut into the workpiece W followed by the next highest teeth (21H, 25H, 27H) which are the right-set tooth 21R, the right-set tooth 25R, and the left-set tooth 27L, after which the left-set tooth 23L and the right-set tooth 29R make their cut. Then the unset tooth 31S, the left-set tooth 33L, the left-set tooth 37L, the right-set tooth 39R, the right-set tooth 35R, and the left-set tooth 41L perform the cutting in that order.

The left-set tooth 23L, the right-set tooth 29R, the right-set tooth 35R, and the left-set tooth 41L are shorter teeth, and, as clearly shown in FIG. 20 (a), they are not positioned consecutively, so that the load on the high teeth —the right-set tooth 25R, the unset tooth 31S, the left-set tooth 37L, and the unset tooth 19S —which follow the left-set tooth 23L, the right-set tooth 29R, the right-set tooth 35R, and the left-set tooth 41L is reduced. Furthermore, the left-set tooth 41L is positioned immediately before the unset tooth 19S, and the right-set tooth 29R is positioned immediately before the unset tooth 31S. Specifically, because the teeth positioned immediately before the unset teeth are alternated to give an equal number of left-set teeth and right-set teeth, the tips of the teeth receive the same amount of abrasion as illustrated in FIG. 19 (d) so that the left and right abrasion over the entire periphery of the saw blade 1 is uniform.

FIGS. 20 (d) and (e) show another mode of FIG. 20 (b). In FIG. 20 (d) both corner sections of the unset tooth 19S are ground, and both side sections are formed as inclined sections 19B at the same inclination. In the example the tip of the unset tooth 19S is formed in a V shape. Use of this embodiment causes the chips to be more reduced in size, which improves the ease with which they are discharged as well as improving the ability of the blade to maintain the cut in a straight line. The operation and function and the effect of this embodiment are the same as those previously described.

In the example shown in FIG. 20 (e) a proper number of suitably-formed V-shaped or U-shaped notches 19N are formed in the tip of the unset tooth 19S. In this case, the formation of the notch 19N results in a V-shaped remainder section being left from the cutting action of the tooth 19S. This remainder section is removed by the subsequent cutting action of the unset tooth 31S, resulting in even finer size reduction of the chips. The operation and function and the effect of this embodiment are the same as those previously described.

Once again referring to FIGS. 20 (a) to (c), the left-set tooth 41L and the right-set tooth 29R which immediately precede the unset teeth 19S and 31S, respectively, are shorter teeth. An improved buffering effect can be added by positioning a tooth of medium height between the right-set tooth 29R and the unset tooth 31S, and another tooth of medium height between the left-set tooth 41L and the unset tooth 19S, to act as buffer teeth.

From the explanation of this embodiment of the present invention it can be readily understood that the present invention relates to a saw blade comprising a right-set tooth which is bent to the right, and a left-set tooth which is bent to the left relative to the running direction of the saw blade, in combination with an unset tooth which is not bent transversely. In addition, there is a difference in height in the direction of cut of the saw blade and in the direction of set width. A set tooth is provided immediately preceding an unset tooth so that a cutting action can be carried out alternately by a left-set tooth and by a right-set tooth, suitably repeated. Accordingly, the chips are more reduced in size, which improves the case with which they are discharged. The positioning of the tooth immediately preceding an unset tooth along the length of the saw blade such that all teeth are set in the same direction is avoided, and both left-side abrasion and right-side abrasion are produced alternately in the unset teeth, with the overall effect of even abrasion. Accordingly, in comparison with conventional saw blades, a cut made with the saw blade of the present invention hardly veers from the path of the cut. This feature is especially effective in high speed cutting and heavy cutting.

In addition, the saw blade of the present invention can be effectively utilized with all types of sets, with the stipulation that either a right-set tooth or a left-set tooth is positioned immediately before an unset tooth, and not just with a raker set.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A saw blade for cutting metallic materials comprising a combination of a right-set tooth, which is bent to the right, a left-set tooth which is bent to the left in relation to the running direction of the saw blade, and an unset tooth which is not bent, and
   further comprising:
   a first pattern wherein the teeth are positioned in the running direction in the order of right set tooth, unset tooth, left-set tooth; and
   a second pattern wherein the teeth are positioned in the running direction in the order of left-set tooth, unset tooth, right-set tooth; and
   an odd number greater than one of additional set teeth positioned between said first and second patterns,
   wherein said additional set teeth are positioned such that right-set teeth and left-set teeth are adjacent each other.

2. The saw blade of claim 1 wherein each unset tooth has a cutting tip having a V-shape.

3. The saw blade of claim 1 where each unset tooth has a cutting tip having a notch formed therein.

4. The saw blade of claim 1 wherein the teeth of the saw blade form one group of twelve teeth comprising said first pattern and three additional set teeth and said second pattern and three additional set teeth.

5. The saw blade of claim 1, wherein each of the set teeth of said first pattern and said additional set teeth and the set teeth of said second pattern and said additional set teeth are alternately set.

6. A saw blade for cutting metallic materials comprising a combination of teeth each having a set direction, including a right-set tooth, which is bent to the right, a left-set tooth which is bent to the left in relation to the running direction of the saw blade, and an unset tooth which is not bent, and
   further comprising;
   a first pattern wherein the teeth are positioned in the running direction in the order of right-set tooth, unset tooth, left-set tooth; and
   a second pattern wherein the teeth are positioned in the running direction in the order of left-set tooth, unset tooth, right-set tooth; and
   an odd number of additional set teeth positioned between said first and second patterns,
   wherein the first pattern and second pattern are positioned alternately,
   wherein said odd number of additional set teeth are set toward the opposite direction against the set direction of a tooth positioned at both sides of each additional tooth; and
   wherein the teeth of the saw blade form one group of twelve teeth, comprising said first pattern and three additional set teeth and said second pattern and three additional set teeth.

7. The saw blade of claim 6 wherein each of the set teeth of both of said first and second patterns are alternately set.

8. The saw blade of claim 7 wherein one of the set teeth of both of the first and second patterns have a height from a base position on the saw blade to the tip of said set teeth which is smaller than the height of said unset teeth.

9. The saw blade of claim 8 wherein an additional one of the set teeth of both of the first and second patterns have a height which is smaller than the height of said unset teeth.

10. The saw blade of claim 9 wherein the smaller the height of the set tooth, the wider is the set of said set tooth in the lateral direction of the saw blade.

11. The saw blade of claim 9 wherein the left-set and right-set teeth having smaller heights are positioned non-consecutively.

12. The saw blade of claim 8 wherein an additional one of the set teeth of both of the first and second patterns have a height which is equal to the height of said unset teeth.

13. The saw blade of claim 12 wherein the smaller the height of the set tooth, the wider is the set of said set tooth in the lateral direction of the saw blade.

14. The saw blade of claim 12 wherein the left-set and right-set teeth having smaller heights are positioned non-consecutively.

* * * * *